(12) United States Patent
Lechner

(10) Patent No.: US 6,552,866 B1
(45) Date of Patent: Apr. 22, 2003

(54) LIBRARY APPARATUS

(75) Inventor: Ulrich Lechner, Oettingen (DE)

(73) Assignee: Grau Software GmbH (DE)

( * ) Notice: Subject to any disclaimer, the term of this patent is extended or adjusted under 35 U.S.C. 154(b) by 0 days.

(21) Appl. No.: 09/136,796

(22) Filed: Aug. 19, 1998

(51) Int. Cl.[7] .................. G11B 17/00; G11B 15/68; G11B 17/08
(52) U.S. Cl. .................. 360/69; 360/92; 360/98.04
(58) Field of Search .................. 360/92, 69, 71, 360/88, 90, 91, 97.01, 98.01, 98.04, 98.05, 98.06

(56) References Cited

U.S. PATENT DOCUMENTS

| 3,876,978 A | 4/1975 | Bossen et al. ..... 340/146.1 AG |
| 4,860,133 A | 8/1989 | Baranski ..................... 360/92 |
| 5,323,327 A | 6/1994 | Carmichael et al. ........ 364/478 |
| 5,456,528 A | 10/1995 | Dalziel ....................... 312/9.46 |
| 5,790,338 A * | 8/1998 | Kanai et al. ............... 360/92 X |
| 5,808,828 A * | 9/1998 | Forrer et al. ................ 360/92 |
| 5,886,853 A * | 3/1999 | Yoshida et al. ........... 360/69 X |

FOREIGN PATENT DOCUMENTS

| DE | 2421 112 C2 | 1/1975 | .......... G06F/11/10 |
| DE | 44 05 363 A1 | 8/1995 | |
| JP | 5-274760 A | 10/1993 | .......... G11B/15/68 |

* cited by examiner

Primary Examiner—Andrew L. Sniezek
(74) Attorney, Agent, or Firm—Sheridan Ross P.C.

(57) ABSTRACT

In order to improve a data carrier archiving system with a data carrier store comprising a plurality of storage compartments and at least one disk drive for data carriers and with a data carrier transport unit movable in the space in three different spatial directions by a handling unit for transporting the data carriers between different compartments of the data carrier store and/or the at least one drive, in such a manner that checking of the positioning of the data carrier transport unit is possible with measures which are as simple as possible it is suggested that the data carrier transport unit be provided with a position detection unit, by which scanning of a reference object can be carried out after random operational phases for the exact determination of a position the data carrier transport unit in at least one of three different spatial directions.

37 Claims, 9 Drawing Sheets

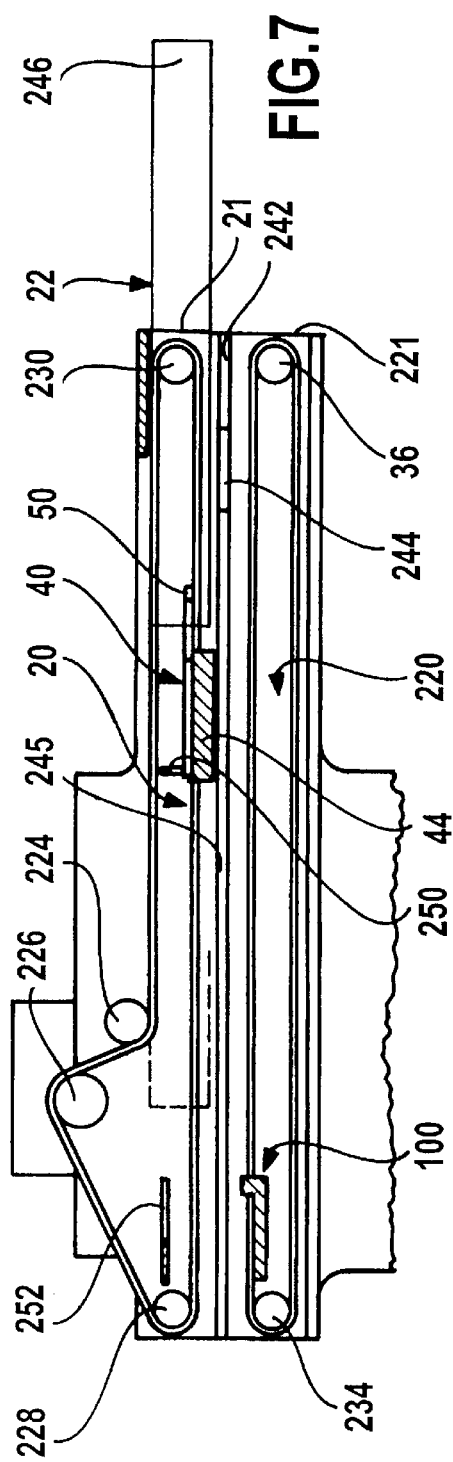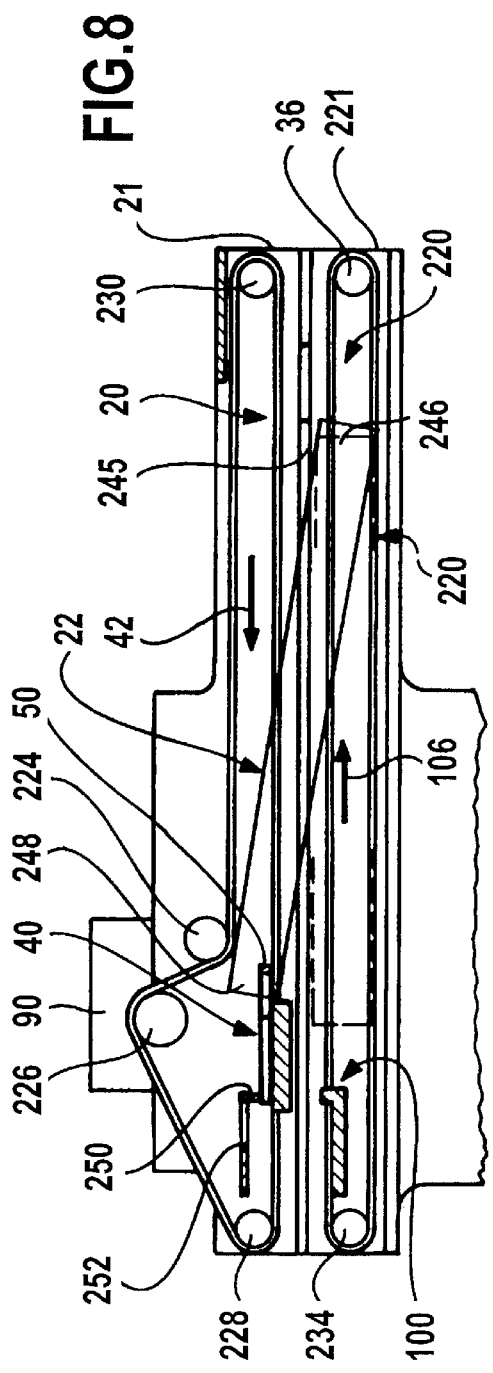

LIBRARY APPARATUS

The invention relates to a data carrier archiving system with a data carrier store comprising a plurality of storage compartments and at least one disk drive for data carriers and with a data carrier transport unit movable in the space in three different spatial directions by means of a handling unit for transporting the data carriers between different compartments of the data carrier store and/or the at least one disk drive.

In this respect, a data carrier is to be understood as any storage medium for symbols which is in a position to store pictures, language, music or other data.

Data carrier archiving systems of this type are known from the state of the art. In the case of such data carrier archiving systems, there is always the risk that stored and updated information concerning the position of the data carrier transport unit, which is provided for the control of the handling unit for moving the data carrier transport unit, either becomes lost or displays errors with increasing operation of the data carrier archiving system and so a point in time arrives, at which the data carrier transport unit is no longer in a position, on account of inexact positioning, to grip a data carrier, for example, in the compartment of the data carrier store provided for this correctly and reliably.

For this reason, it is necessary to provide the handling unit for the movements of the data carrier transport unit again with correct position information concerning the exact position of the data carrier transport unit; this can, for example, be carried out in that manual, so-called "teach processes" are carried out, with which the data carrier transport unit is moved manually to a predetermined position which then serves as reference position for the further movement of the data carrier transport unit by means of the handling unit.

The previous solutions for the exact determination of the position of the data carrier transport unit are all very time-consuming and sometimes very complicated and so the checking of the position of the data carrier transport unit is avoided when it is not absolutely necessary.

The object underlying the invention is therefore to improve a data carrier archiving system in such a manner that checking of the positioning of the data carrier transport unit is possible with measures which are as simple as possible.

This object is accomplished in accordance with the invention, in a data carrier archiving system of the type described at the outset, in that the data carrier transport unit is provided with a position detection unit, by means of which scanning of a reference object can be carried out after random operational phases for the exact determination of a position of the data carrier transport unit in at least one of three different spatial directions.

The advantage of the inventive solution is to be seen in the fact that by means of the position detection unit and a reference object provided for this an ascertainment of the position of the data carrier transport unit is possible in a simple manner and without considerable time being required.

This can be realized particularly favorably when the position detection unit optically detects a position of an object of measurement influenced by the position of the data carrier transport unit in the space relative to the reference object.

As a result of the optical detection of the positions of the object of measurement, the position detection can be realized, on the one hand, quickly and, on the other hand, also inexpensively since an optical detection of an object of measurement can be carried out with inexpensive constructional units.

A particularly simple solution which also ensures a high measurement accuracy provides for the position detection unit to be arranged on a housing of the data carrier transport unit so that its position can be detected as exactly as possible.

With respect to the design of the object of measurement itself, the most varied of solutions are conceivable. For example, one advantageous embodiment provides for the object of measurement to represent a part of the data carrier transport unit which can interact with the reference object. Such an object of measurement forming part of the data carrier transport unit could be, for example, a measurement arm provided on the data carrier transport unit, the individual positions of which are monitored when this is in mechanical interaction with the object of measurement.

With respect to the design of the reference object, no further details have been given in conjunction with the preceding description of the individual embodiments. One advantageous embodiment, for example, provides for the reference object to have, for example, the shape of a cube with known dimensions.

However, in order to be able to scan the reference object advantageously with the movable measurement arm, it is provided for the reference object to have the shape similar to that of an area of the data carrier which interacts with the at least one gripping arm during the gripping of this data carrier.

A particularly simple solution from a constructional point of view provides for the at least one measurement arm to be mounted on a support member thereof so as to be movable, preferably pivotable.

In a particularly favorable embodiment, it is provided for the support member, for its part, to be movable in a gripping direction relative to the data carrier transport unit.

In order to be able to use the measurement arm as object of measurement with as little resources as possible, it is preferably provided for the at least one measurement arm, held standing in a starting position by an elastic biasing means, to be movable out of its starting position contrary to the action of the elastic biasing means. Such a solution has the advantage that a position which is always taken up automatically by the measurement arm is already predetermined mechanically by the elastic biasing means and so, with respect to the monitoring of the individual positions, a starting position is available, into which the measurement arm returns automatically when it is not acted upon.

Thus, the position detection unit may be designed in a particularly advantageous manner when the position detection unit detects deviations of the at least one gripping arm from the starting position. In this respect, two positions of the measurement arm are sufficient in the simplest case. It is, however, even more advantageous when more than two positions may be detected.

In order to increase the sensitivity of the position detection even more, it is preferably provided for the position detection unit, with a predetermined movement of the at least one measurement arm, to detect regions of the measurement arm moving to different extents, wherein the advantage is to be seen in the fact that it is possible, with as precise a detection of the respective position of the measurement arm as possible, to detect regions moving to a greater extent during the predetermined movement of the measurement arm whereas, when the precision is intended to be less great, it is sufficient to detect regions of the measurement arm moving to a lesser extent.

The detection of regions of the measurement arm moving to different extents may be preferably realized in a simple manner during the detection of the pivot position since these regions move to different extents during the movement of the measurement arm depending on their radial distance.

In order to be able to have access to the data carrier in an advantageous manner, it is provided for the measurement arm to be movable in a gripping direction relative to the housing of the data carrier transport unit in order to interact with the reference object and for the position detection unit securely arranged on the housing of the data carrier transport unit to detect different measurement sections of the at least one measurement arm in different positions of the measurement arm in the gripping direction so that the movement of the measurement arm relative to the housing of the data carrier transport unit can be utilized to change, at the same time, the measurement sections of the measurement arm used by the position detection unit as objects of measurement.

A measurement arm represents an additional part and, when this is intended to be used, has to be brought first of all into the position of use relative to the other elements of the data carrier transport unit and so, for this purpose, further additional elements have to be provided on the data carrier transport unit.

For this reason, a particularly favorable solution with respect to its construction and thus also with respect to costs provides for the object of measurement to be at least one movable gripping arm of a gripper means of the data carrier transport unit, the positions of which can be influenced by contact with the reference object effectable in accordance with the positioning of the data carrier transport unit in the space.

The advantage of this solution is to be seen in the fact that the at least one gripping arm of the gripper means of the data carrier transport unit, which is movable in any case, is now used not only for gripping the data carriers but also, at the same time, can be used to represent an object of measurement for the position detection of the reference object.

Thus, reference can be made advantageously during checking of the correct position of the data carrier transport unit relative to the reference object to types of movement of the gripping arm serving as object of measurement which also occur during gripping of a data carrier and so it is no longer necessary to provide the gripping arm, for example, with additional movement possibilities which are required in order to use this successfully as object of measurement for the position detection unit.

The position detection of the object of measurement may be carried out particularly simply when positions of the at least one gripping arm, which are taken up by the gripping arm during gripping of one of the data carriers, can be detected with the position detection unit. With respect to the construction of the position detection unit, there is thus merely the task of detecting the individual positions of the gripping arm which it would carry out in any case during the gripping of a data carrier.

In order, furthermore, to detect the gripping position of the gripping arm in a defined and precise manner, on the one hand, and, on the other hand, to also be able to monitor the remaining positions of the gripping arm with adequate precision, it is preferably provided for the position detection unit to detect a gripping position of the at least one gripping arm corresponding to a gripped data carrier and deviations from the gripping position.

In this respect, it is particularly advantageous when the position detection unit detects deviations from the gripping position in the direction of a release position of the at least one gripping arm and alternatively or in addition thereto it is favorable when the position detection unit detects deviations of the gripping arm from the gripping position in the direction of the starting position so that the position detection unit is in a position to ascertain the direction, in which the position of the gripping arm deviates from the gripping position.

In this respect, it is particularly favorable when the position detection unit detects in the gripping position of the gripping arm the section of the gripping arm which has the greatest radial distance from the pivot axis. It is advantageously provided for the gripping position of the gripping arm to occur when the gripper means itself is also in gripping position, i.e. in its maximum position advanced in the direction towards the data carrier or the reference object.

This solution is particularly advantageous due to the fact that in the gripping position a very precise detection of the position of the gripping arms is required in order to be able to ascertain exactly whether, for example, the gripping jaws have engaged in the recesses provided for them in the desired manner.

Furthermore, one advantageous solution provides for the position detection unit to detect, during detection of the deviation from the starting position, the measurement section of the gripping arm which has the smallest radial distance from the pivot axis, wherein the advantage is to be seen in the fact that first of all a precise detection of the gripping arm as object of measurement is not required when it is leaving the starting position and so the detection of a measurement section of the gripping arm having the smallest distance from the pivot axis is sufficient.

With respect to the positions to be passed through by the gripping arm, it has proven to be particularly favorable when the gripping arm is movable during the interaction with the reference object from its starting position via an intermediate position corresponding to a gripping position into a release position and from this into the gripping position.

The inventive position detection unit may be used particularly favorably when the position detection unit detects two movable gripping arms of the gripper means interacting for gripping one of the data carriers as two separate objects of measurement.

The detection of two movable gripping arms as separate objects of measurement has the additional advantage that, as a result, an exact detection of the position of the data carrier transport unit is possible in an even simpler manner.

This may be realized particularly favorably when the position detection unit compares the positions of the gripping arms with one another in order to detect a position in a spatial direction extending in a direction transverse to the gripping direction and in a plane of movement of the gripping arms.

It is particularly favorable when the position detection unit detects a position in a spatial direction extending in gripping direction as a result of movement of the at least one gripping arm into the gripping position.

Furthermore, it is advantageously provided for the position detection unit to detect a position in a third spatial direction extending transversely to the first and second spatial directions as a result of movement of the gripper means in this spatial direction and additional movement in the second spatial direction and detection of the deviation of the gripping arm from the starting position. With this solution it is possible to use the gripping arm also for determining a position in a spatial direction which normally has no significance for the gripping arm. In particular, the gripper means can thus be used, for example, to detect an upper edge of an end side of a data carrier.

Alternatively to using at least one gripping arm as object of measurement for detecting the reference object, another advantageous embodiment provides for the object of measurement to correspond to the reference object.

For this purpose, it is favorably provided for the object of measurement to be a pattern detectable by the position detection unit, this pattern having markings reflecting optically differently and being associated with a spatially defined location, preferably a spatially defined location in the region of the data carrier store or the disk drives.

With respect to the detection of the pattern, the most varied of solutions are conceivable. For example, it is possible to take a complete picture of the pattern and analyze the individual markings in the picture taken, for example, by means of a digital camera.

Alternatively thereto, it is preferably provided for the position detection unit to scan the marking of the pattern with a reading beam. This solution is, in particular, very inexpensive since devices which generate a reading beam for scanning a pattern can be realized inexpensively.

A particularly simple possibility provides for the position detection unit to move the reading beam in a plane, wherein the reading beam is preferably a laser beam. In the simplest case, the laser beam of a bar code scanner and also the optical detection means may be used for this purpose.

In order to be able to scan it advantageously with the reading beam, the pattern can be designed in the most varied of ways. For example, one advantageous embodiment provides for the pattern to have a marking extending in a first spatial direction parallel to the reading direction.

In this respect, it is preferably provided for the first marking to have a defined extension in the first spatial direction detectable by the position detection unit, wherein the position detection unit preferably detects the extension in the first spatial direction via the time interval detectable on account of the change in the reflection in the area of the first marking.

In order to be able to carry out measurement in a second spatial direction, it is preferably provided for the pattern to have a second marking extending in a second spatial direction extending transversely to the first spatial direction. This second marking serves to detect the position in the second spatial direction. For example, it would be conceivable to detect the second marking by way of a reading direction extending in the second spatial direction.

However, when only one reading direction is available for reasons of as simple a solution as possible, it is preferably provided for the second marking to have an extension detectable in the first spatial direction and varying in the second spatial direction. It is thus possible to obtain information concerning the second spatial direction, despite a reading in the first spatial direction, in that the extension of the second marking in the first spatial direction varies in size depending on the position, in which reading takes place in the second spatial direction.

In order to have a reference parameter available for determining the extension of the second marking varying in the first spatial direction, it is preferably provided for a reference marking having a constant extension in the first spatial direction and independently of the second spatial direction to be associated with the second marking, this reference marking thus always supplying a reference value irrespective of the position, in which reading takes place in the second spatial direction, while the extension of the second marking varying in the first direction varies such that the varying extension can be placed in relation to the extension of the reference marking.

In order, in addition, to be able to determine a distance of the position detection unit from the object of measurement, i.e. from the pattern, it is preferably provided for the position detection unit to have a marking arranged in a defined reference position in relation to the moving reading beam.

In order to be able to determine a distance of the position detection unit from the object of measurement, i.e. from the pattern, it is preferably provided for the position detection unit to have a marking arranged in a defined reference position in relation to a starting point of the moving reading beam.

This marking associated with the position detection unit, which can likewise be read by the reading beam, creates the possibility of obtaining a reference value, in relation to which the extension of the first and second markings of the pattern can be placed.

This can be realized particularly favorably in that the marking is designed as a screen determining a defined extension in the first spatial direction, this screen creating the possibility of obtaining a fixed reference value for ascertaining the extension of the markings in the respective spatial directions.

In this respect it is particularly favorable when the position detection unit ascertains a distance between the position detection unit and the first marking from a ratio of the extension of the screen in the first spatial direction to the extension of the first marking in the first spatial direction.

Furthermore, it is preferably provided for the position detection unit to ascertain a position in the first spatial direction from a relative position of the extension in the first spatial direction defined by the screen in relation to the extension defined by the first marking.

Furthermore, it is particularly advantageous when the position detection unit ascertains a position in the second spatial direction on the basis of a ratio of the extension of the second marking in the first spatial direction to the extension of the reference marking in the first spatial direction.

Additional features and advantages are the subject matter of the following description as well as the drawings illustrating several embodiments. In the drawings:

FIG. 7 shows a section similar to 6—6 during the drawing in of a data carrier cassette;

FIG. 8 shows a section similar to 6—6 during the transfer of the data carrier cassette from an upper compartment into a lower compartment;

Figure 1:
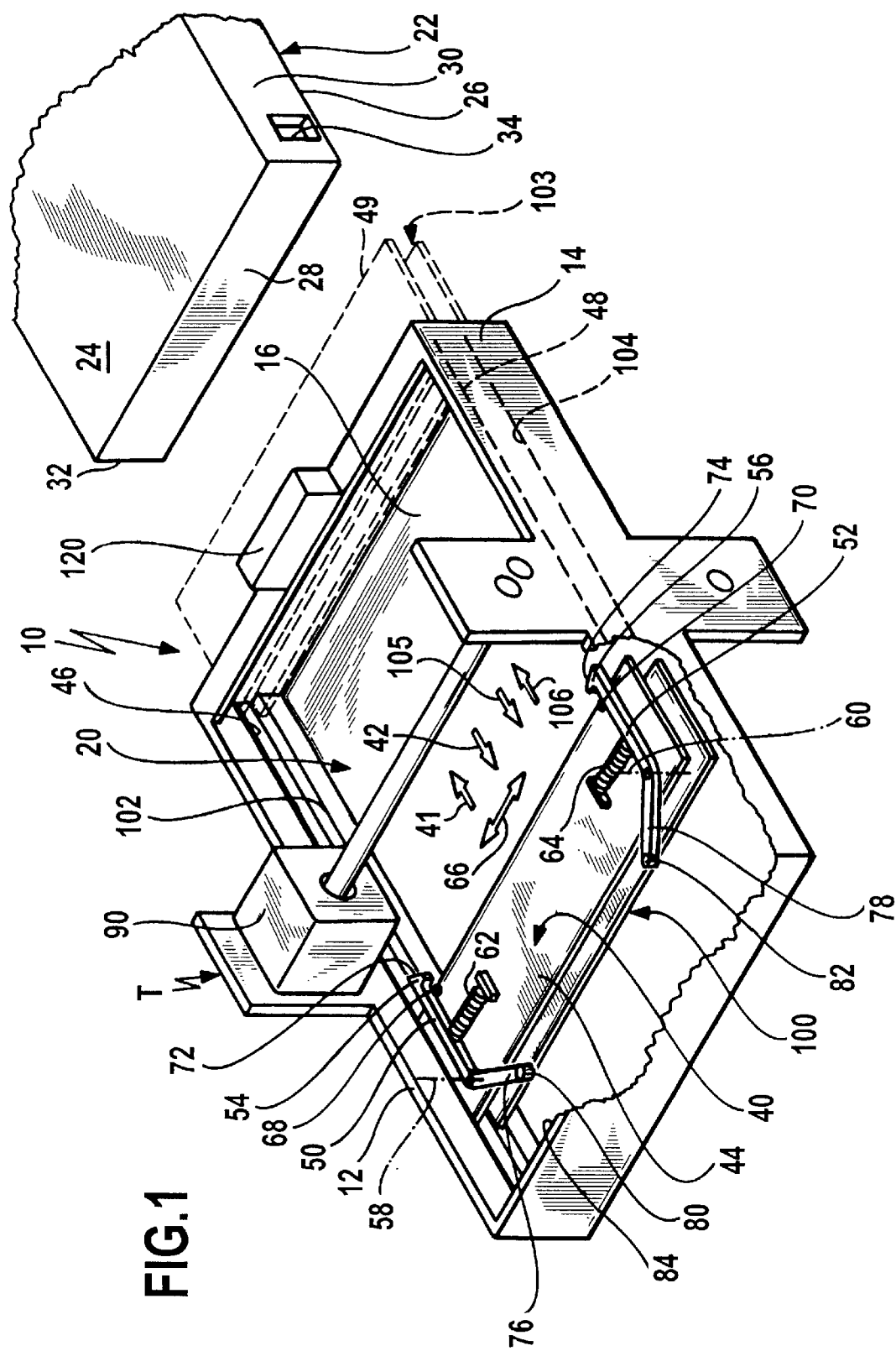
FIG. 1 shows a schematic, perspective illustration of a first embodiment of an inventive data carrier transport unit with a data carrier cassette.

A first embodiment of an inventive data carrier transport unit T for data carriers, illustrated in FIG. 1, comprises a housing designated as a whole as 10 which has side parts 12 and 14 as well as a base part 16 and forms with these side parts 12 and 14 as well as the base part 16 a compartment designated as a whole as 20 for receiving a data carrier cassette 22 via a compartment opening 21 arranged on one side of the housing in order to transport this.

The data carrier cassette 22 is designed, in particular, as a flat member with an upper flat side 24, a lower flat side 26, an end side 28 as well as two narrow sides 30 and 32 located opposite one another.

In the region of the narrow sides 30 and 32, recesses 34, which form a gripping area, are preferably provided near to the end side 28 in order to grip the data carrier cassette 22 and draw it into the compartment 20 of the data carrier transport unit T.

In order to draw in the data carrier cassette 22, the data carrier transport unit is provided with a draw-in gripper means which is designated as a whole as 40 and is movable towards the compartment opening 21 in a gripping direction 41 and away from the compartment opening 21 in a draw-in direction 42 opposite to the gripping direction 41 so that it is in a position to grip a data carrier cassette 22 located in front of the compartment outside the housing 10 and draw it into the compartment 20.

For this purpose, the draw-in gripper means 40 has a slide 44 which is guided on longitudinal guide means 46 and 48 arranged on the respective side parts 12 and 14, wherein the longitudinal guide means extend parallel to the gripping direction 41 or draw-in direction 42 and thus guide the draw-in gripper means 40 in a plane 49 parallel to the draw-in direction.

The slide 44 is preferably designed as a plate which is guided at its ends in the longitudinal guide means 46 and 48. In addition, two gripping arms 50 and 52 are mounted on the slide 44 and these have gripping jaws 54 and 56 on a front side which are movable transversely to the draw-in direction 42, preferably in a plane parallel to the base part 16.

This may be realized particularly favorably in that the gripping arms 50 and 52 are mounted so as to be pivotable about pivot axes 58 and 60 which are preferably at right angles to the plate-like slide 44.

Furthermore, each of the gripping arms 50 and 52 is biased in the direction towards the respectively other arm by means of a spring 62 and 64 so that the gripping arms have the tendency to move the gripping jaws 54 and 56 towards one another in a closure direction 66 which extends transversely to the draw-in direction 42, wherein this movement is preferably limited by stop elements 68 and 70.

So that the gripping jaws 54, 56 can engage with the recesses 34 in the region of the narrow sides 30 and 32, each of the gripping arms 52, 54 is provided on its front end facing the data carrier cassette 22 with deflector surfaces 72 and 74 which extend at an angle to the draw-in direction 42 and, when pushing against the end side 28 of the data carrier cassette 22, move the gripping arms 50 and 52 away from one another contrary to the closure direction 66 to such an extent that the gripping hooks 54 and 56 have the possibility of sliding laterally over the end side 28 over the narrow sides 30 and 32 for such a time until they engage in the recesses 34 due to a transfer into a gripping position.

In addition, each of the gripping arms 50 and 52 is provided with a respective control arm 76, 78 which preferably extends on a side of the respective pivot axis 58, 60 located opposite the gripping arm 50, 52 and bears at its end a control element 80, 82 which effects a movement of the gripping arms 50, 52 into a release position and thus a moving apart of the gripping jaws 54, 56 contrary to the closure direction 66, for example, in the case of the draw-in gripper means 40 illustrated in FIG. 1 when the draw-in gripper means 40 is in an opening position in the housing 10 which is displaced in relation to the end position illustrated in FIG. 1 still further in draw-in direction 42, wherein in this opening position the control members 80, 82 come to rest on a rear wall 84 of the housing 10 and thus initiate a movement of the gripping arms 50, 52 which leads, in the opposite direction to the active force of the springs 62, 64, to a moving apart of the gripping hooks 54, 56 contrary to the closure direction 66 and thus to the release position.

In order to move the draw-in gripper means 40, a servomotor is provided which is designated as a whole as 90 and acts on the draw-in gripper means 40 via the cable or belt drives which are not illustrated in the drawings for reasons of clarity.

When the data carrier cassette 22 is intended to be drawn into the compartment 20, the draw-in gripper means 40 is moved by the servomotor 90, proceeding from its position illustrated in FIG. 1 by solid lines, along the longitudinal guide means 46 and 48 in gripping direction 41 into a forward end position or gripping position which is located near to the compartment opening 21 and indicated in FIG. 1 by dashed lines. In this position, the gripping arms 50 and 52 project with the gripping jaws 54 and 56 forwards beyond the housing 10 to such an extent that they are in a position to engage in the recesses 34 of a data carrier cassette located in front of the compartment opening 21, wherein prior to reaching the gripping position the deflector surfaces 72 and 74 come to rest on the end side 28 and the gripping arms 50 and 52 are thereby moved contrary to the closure direction so that the gripping hooks 54 and 56 as already described— can slide over the narrow sides 30 and 32 into the recesses 34 and then remain in the gripping position in these recesses on account of the action of the springs 62 and 64. If the draw-in gripper means 40 is then moved back in draw-in direction 42 in the direction of the end position illustrated by solid lines, the data carrier cassette 22 is drawn into the compartment 20 and while the data carrier cassette is being drawn into the compartment 20 the gripping jaws 54 and 56 hold the data carrier cassette securely.

In the end position, as well, the data carrier cassette 22 is still held securely by the gripping jaws 54 and 56 of the gripping arms 50 and 52. If the data carrier cassette 22 is intended to be moved out of the compartment 20 again, the draw-in gripper means 40 is moved even further in draw-in direction 42 beyond the illustrated end position into the opening position, in which the control members 80 and 82 then abut on the rear wall 84 and lead to a movement of the gripping arms 50 and 52 into the release position in the manner already described so that the gripping jaws 54 and 56 are moved out of the recesses 34 and release the data carrier cassette 22.

The data carrier cassette 22 is moved out of the compartment 20 by means of an ejector 100 which is arranged, for example, between the draw-in gripper means 40 and the base part 16 and is likewise guided in longitudinal guide means 102 and 104, which are arranged on the side parts 12 and 14, and is movable in an ejection direction 106 parallel to the draw-in direction 42 and a return direction 105 opposite to this.

This ejector 100 is displaceable by means of a servomotor not illustrated in the drawings in the ejection direction 106 and contrary thereto along the guide means 102, 104 and undertakes the task of pushing a data carrier cassette released by the draw-in gripper means 40 and arranged in the compartment 20 out of this compartment, wherein the ejector 100 is thereby moved from the starting position illustrated schematically in FIG. 1 as far as the compartment opening 21 and thereby pushes the data carrier cassette 22 out of the compartment, wherein the ejector 100 is, in the simplest case, designed like a plate and acts with its end side, for example, against the end surface 28 of the data carrier cassette 22.

Figure 2:
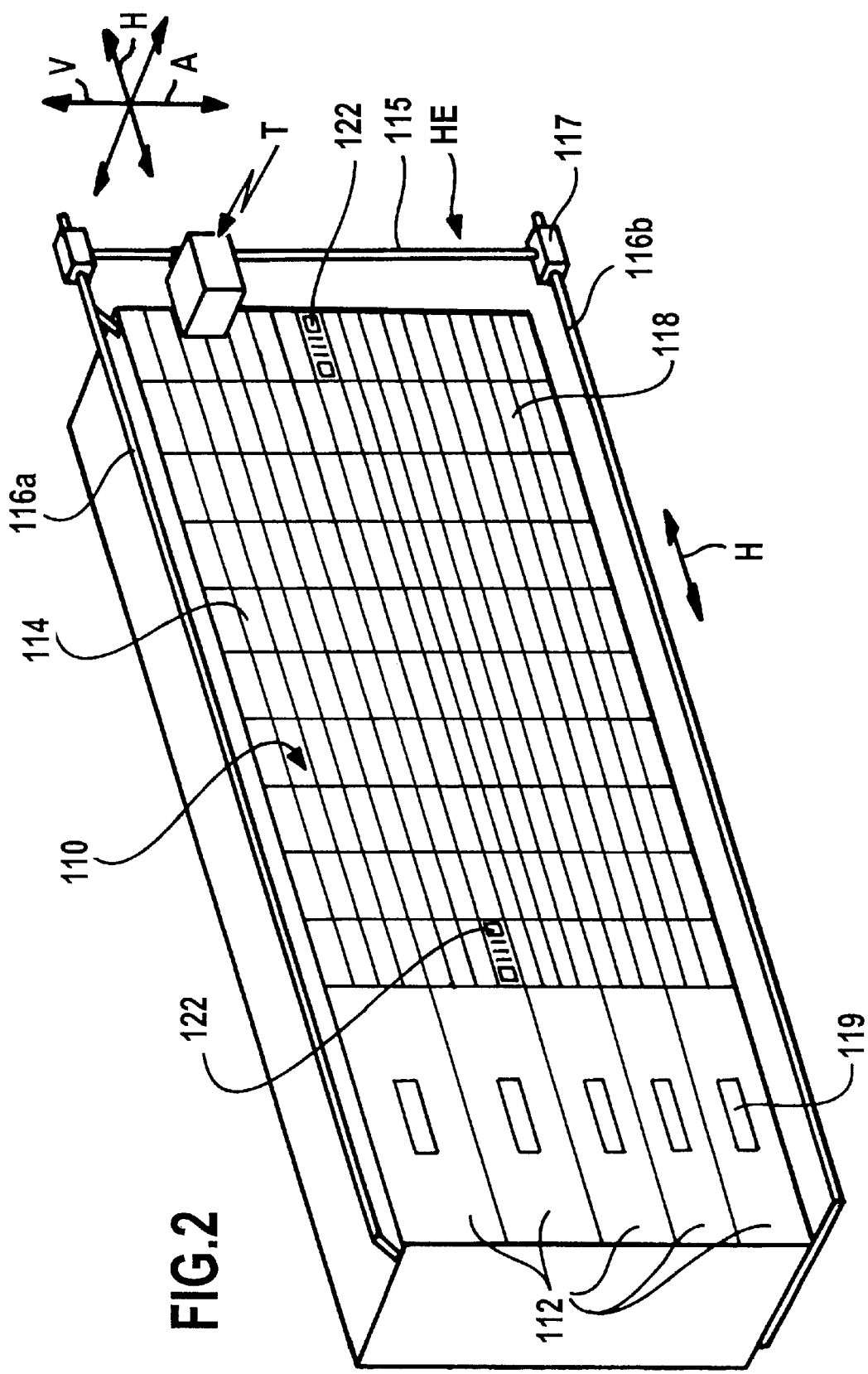
FIG. 2 shows a schematic, perspective view of one embodiment of an inventive data carrier archiving system with an inventive data carrier transport unit.

A data carrier transport unit T of this type may preferably be used in an inventive data carrier archiving system illustrated in FIG. 2, which has a data carrier store designated as a whole as 110 and, in addition, a plurality of disk or tape drives 112, into which the data carriers 22 stored in individual compartments 114 of the data carrier store can be inserted.

In order to transport the data carriers from the individual compartments 114 to other compartments or to the drives 112 or from the drives 112 to individual compartments 114 again, the data carrier transport unit T is mounted on a vertical arm 115 of a handling unit HE, on which the data carrier transport unit T is displaceable in vertical direction V, so as to be movable by means of a handling unit HE in three different spatial directions and, in addition, the vertical arm 115 is displaceable in horizontal direction H on two rail guide means 116a and 116b of the handling unit HE extending parallel to one another, wherein a displacing unit 117 which is connected to the vertical arm 115 is provided for this purpose.

In addition, the inventive data carrier transport unit T is also movable in the direction of a front plane 118, in which all the compartments 114 of the data carrier store 110, wherein this direction is designated as distance direction A from the plane 18.

In order to be able to position the inventive data carrier transport unit T by means of the handling unit exactly relative to the storage compartments 114 or to the individual insert compartments 119 of the drives 112 in order to insert the data carriers 22 into them or remove these from them, the data carrier transport unit T is, as illustrated in FIG. 1, provided with a position detection unit 120 which interacts with a reference object 122 which is arranged at defined locations and in a defined position, for example, on the data carrier store 110 in order to create the possibility of checking and, where necessary, correcting the positioning of the data carrier transport unit T by the handling unit HE in the space, in particular, of the axes V, H and A prior to or following random operational phases in order to preclude errors during the further positioning of the data carrier transport unit T.

Figure 3:
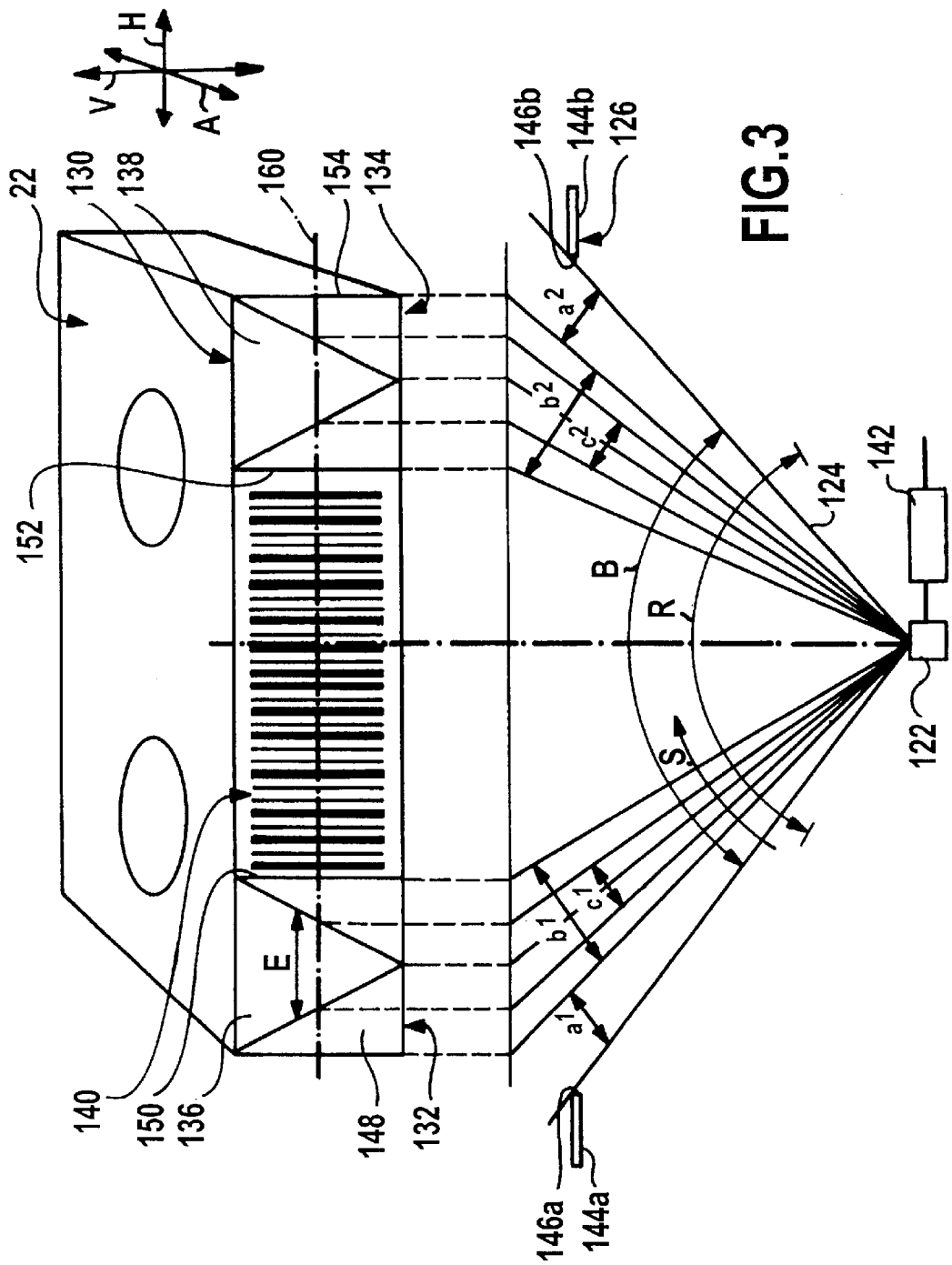
FIG. 3 shows a schematic illustration of an inventive position detection unit and a position ascertainment on the basis of a reference object in the first embodiment.

The position detection unit 120 comprises, as illustrated in FIG. 3, an optical reading unit 122 which generates a reading beam 124 and pivots over a solid angle R in a plane coinciding with the plane of drawing in FIG. 3 in order to recognize reflecting and non-reflecting areas in each position within the solid angle R.

Furthermore, a screen 126 is associated with the reading unit 122 and this defines, for the purpose of reading, an angular viewing range B which is smaller than the solid-angle area R, over which the reading beam 124 is moved. The screen 126 can thereby be arranged securely on the housing, like the reading unit, but it can also be extendible into its effective position, for example, in the direction of the object of measurement for the purpose of reading. One possibility of arranging the screen 126 so as to be extendible is to move the screen with the draw-in gripper means 40 or even arrange it on this gripper means.

Within the angular viewing range B the reading unit 122 is now in a position to scan with the reading beam 124 an object of measurement pattern which is designated as a whole as 130 and serves as reference object and which is constructed in the form of a reflecting pattern and has several markings 132 and 134 as well as 136 and 138 and, in addition, 140 which are all scanned by the reading beam 124 of the reading unit, wherein the signal of the reading unit 122 is evaluated in a signal evaluation stage 142 as will be described in detail in the following.

For example, the screen 126 has a reflecting surface 144 facing the reading beam 124 so that the reading beam 124 generates a reflecting signal for as long as it impinges on the surface 144 during its movement over the solid angle R, and the reflecting signal does not attenuate until a screen opening 146 is reached.

If it is assumed that the reading beam swings in a pivot direction S, the reading beam 124 sweeps first of all over the reflecting surface 144a of the screen 126 until it reaches the screen opening 146a and, subsequently, does not see any reflecting surface during an angular range al. It impinges on an edge 148 of the reflecting marking 132 only after passing through the angular range al and so a reflecting signal results again after the angular range al since a front side of the marking 132 is designed to be reflecting.

Without the marking 136 a reflecting signal would be detected for such a time until the reading beam 124 reaches the edge 150 of the marking 132 located opposite the edge 148.

In addition, a conventional bar code representing a marking 140 would then be readable, which does not convey any position information for the data carrier transport unit but can be used to identify the object of measurement 130 as such in a reading procedure with the pattern when several such objects of measurement are intended to be used. It is, however, also conceivable for elements of the bar code to represent markings for the position detection.

After detecting the bar code 140, the reading beam 124 impinges again on an edge 152 of the reflecting marking 134 and, without the marking 138, would generate a reflecting signal for such a time until the edge 154 located opposite the edge 152 is reached.

A further movement of the reading beam 124 as far as the screen opening 146b of the screen 126 will, again, not generate any reflecting signal and only after an impingement on the reflecting surface 144b of the screen 126 will a reflecting signal again be generated.

Figure 4:
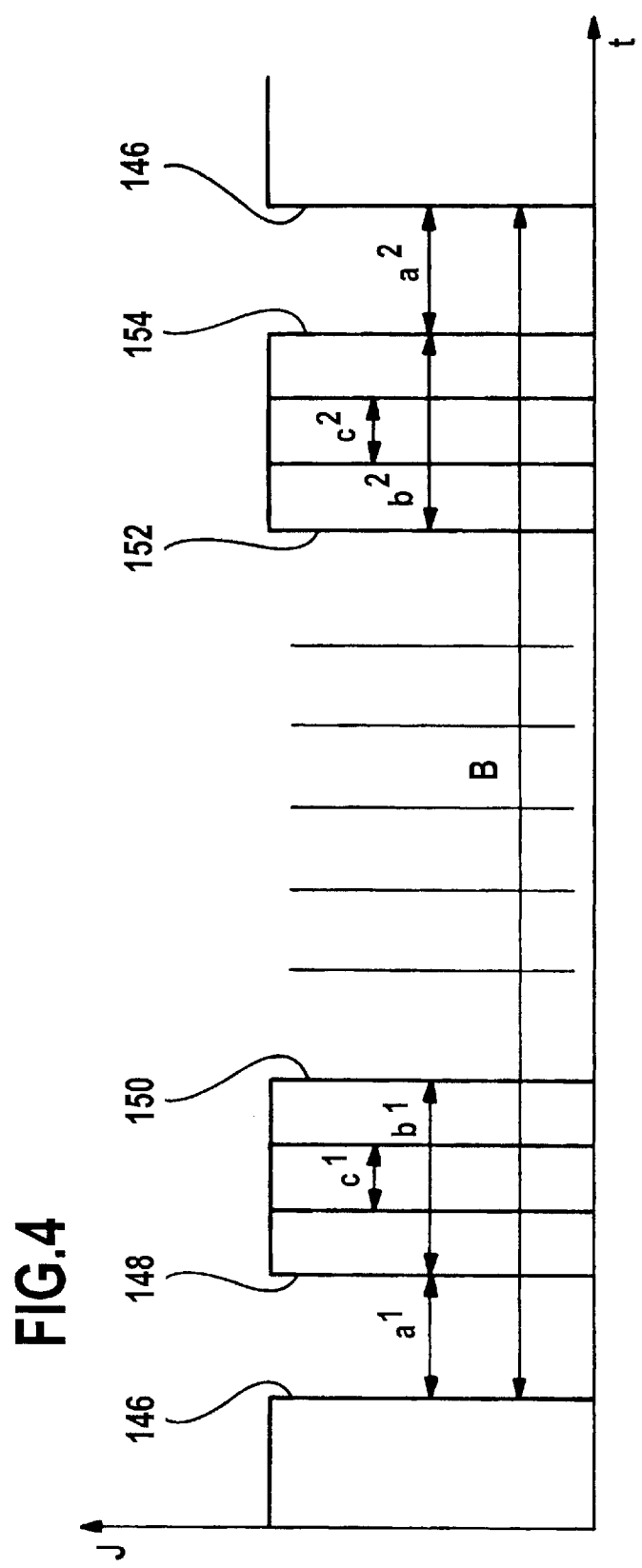
FIG. 4 shows an illustration of the reflected intensities detected by the position detection unit in accordance with the first embodiment, corresponding to the position of the reference object serving as object of measurement.

The course of intensity of the reflecting signal is illustrated in FIG. 4, wherein it is apparent that the reading beam 124 generates during the pivoting movement illustrated in FIG. 3 a course of intensity of the reflecting signal which makes the angular range al between the screen opening 146 and the edge 148 of the marking 132 recognizable as a break in the signal and likewise an angular range a2 between the screen opening 146b and the edge 154 of the marking 134. If the object of measurement 130 designed as a pattern is positioned at a spatially defined location and the reading beam 124 is pivoted in a horizontal plane, the time interval corresponding to the solid angles a1 and a2 can be ascertained via the signal evaluation stage 142, on the one hand, and thus it may be ascertained whether the position detection unit 120 is arranged so as to be centered in relation to the pattern 130 which is the case when the time intervals corresponding to the angular ranges a1 and a2 are equal. It is thus possible solely by way of this evaluation to determine the position of the position detection unit 120 relative to the pattern 130 in the horizontal direction H exactly and thus determine the absolute position in a horizontal direction exactly when the positioning of the pattern 130 in a horizontal direction is known.

Since the screen 126 is part of the position detection unit 120 and thus the angular viewing range B defined by this does not alter, the time interval corresponding to the angular viewing range B can, for example, be placed in relation to the time intervals corresponding to the angular ranges a1 and a2, from which a distance of the position detection unit 120 from the pattern 130 in distance direction A results since with increasing distance between the position detection unit 120 and the pattern 130 the angular ranges a1 and a2 also become larger.

Instead of the angular ranges a1 and a2, it would likewise be conceivable to determine the angular ranges b1 and b2 or the time intervals for the angular ranges a1 and b2 as well as a2 and b2 and then place these in ratio to the time interval corresponding to the angular viewing range B.

If the pattern 130 is positioned in vertical direction V in a defined manner, the vertical position of the position detection unit may be determined in addition via the markings 136 and 138. The markings 136 and 138 are designed, for example, as non-reflecting markings and have in the direction of the horizontal direction H an extension E which varies in vertical direction V. In the simplest case, the markings 136 and 138 are designed as triangles, the base side of which extends parallel to the horizontal H.

If these markings 136 and 138 are provided as non-reflecting markings within the markings 132 and 134, the reading beam 134 recognizes, when sweeping over the marking 132, not only its outer edges 148 and 150 and, when sweeping over the marking 134, its outer edges 152 and 154, between which the respective intensity of the reflected reading beam can be detected, but a break in the intensity occurs again within the edges 148 and 150 or 152 and 154 during a period of time which corresponds to the angular range c1 and c2, respectively, over which the reading beam 124 must be moved in order to pass through the extension of the respective marking 136 and 138 in the horizontal direction H, wherein this extension varies according to the position in vertical direction, in which the reading beam sweeps over the markings 136 and 138. If the markings 136 and 138 are swept over, for example, at the level of the detection line 160 illustrated in FIG. 3 by a dash-dot line, a break in intensity is registered again within the angular ranges b1 and b2, which correspond to the extension of the markings 132 and 134 in the horizontal direction, over the period of time corresponding to the respective angular range c1, wherein this period of time is representative for the position of the detection line 160 in vertical direction V. If the time interval measured for the angular ranges c1 and c2 is now placed in relation to the time interval for the angular ranges b1 and b2 which are independent of the position of the detection line 160 in vertical direction since the edges 148 and 150 or 152 and 154 extend parallel to the vertical V, a measure for the position of the detection line 160 in vertical direction and thus also the position of the data carrier transport unit T in vertical direction may be determined from the ratio, with a prescribed arrangement and course of the markings 136 and 138, respectively, on account of the position of the position detection unit 120 determined in vertical direction.

The object of measurement 130 can now be arranged at a fixed location in the area of the data carrier store, preferably in the plane 118, as indicated schematically in FIG. 2.

It is, however, also conceivable, as indicated schematically in FIG. 3, to provide each data carrier cassette 22 with such an object of measurement 130 and thus carry out an alignment of the internal position with the actual position of the data carrier cassette 22 prior to the gripping of each of the data carrier cassettes 22.

Figure 5:
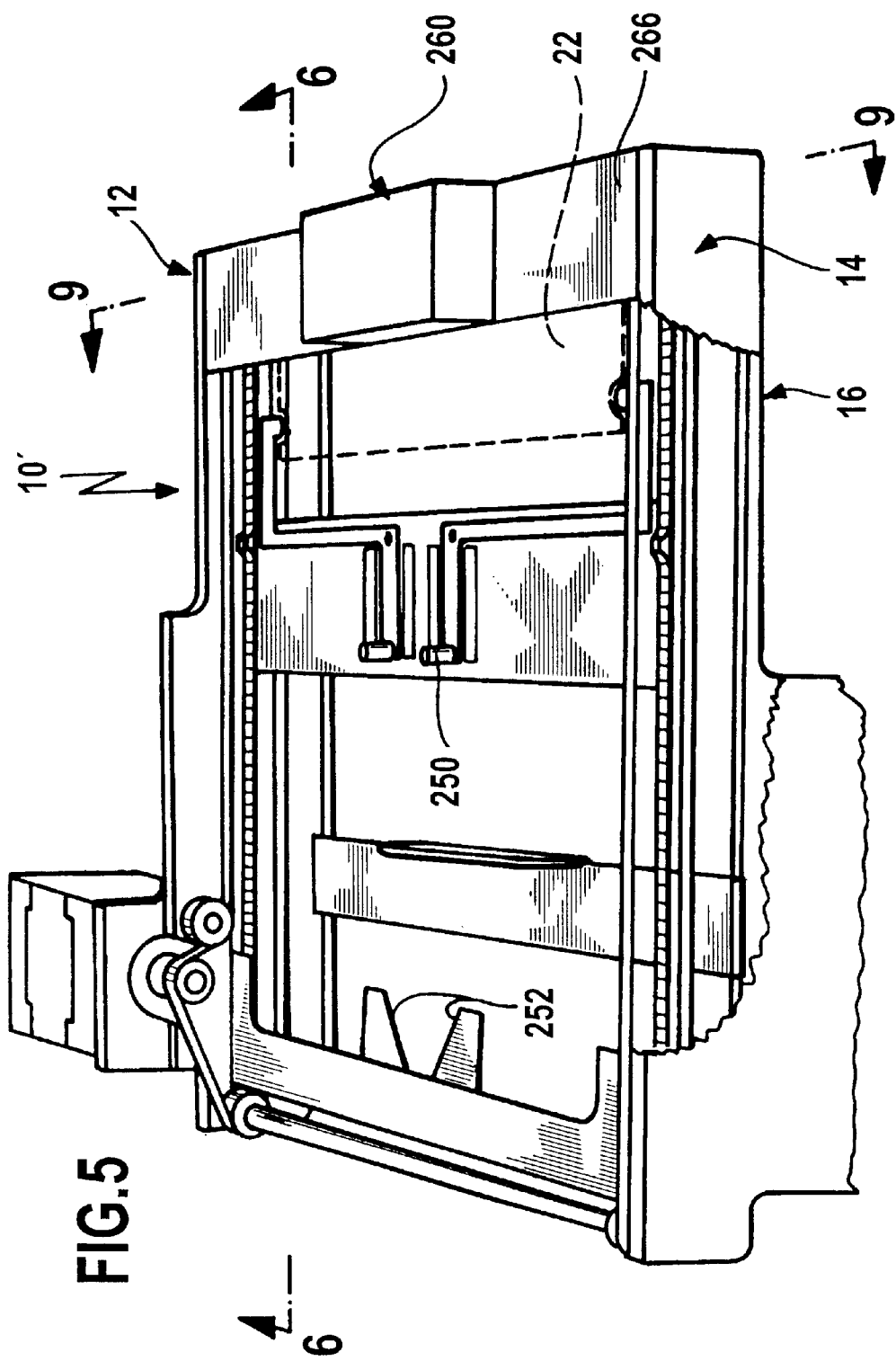
FIG. 5 shows a schematic, perspective illustration of a second embodiment of an inventive data carrier transport unit which can likewise be used in a data carrier archiving system according to FIG. 2.
Figure 6:
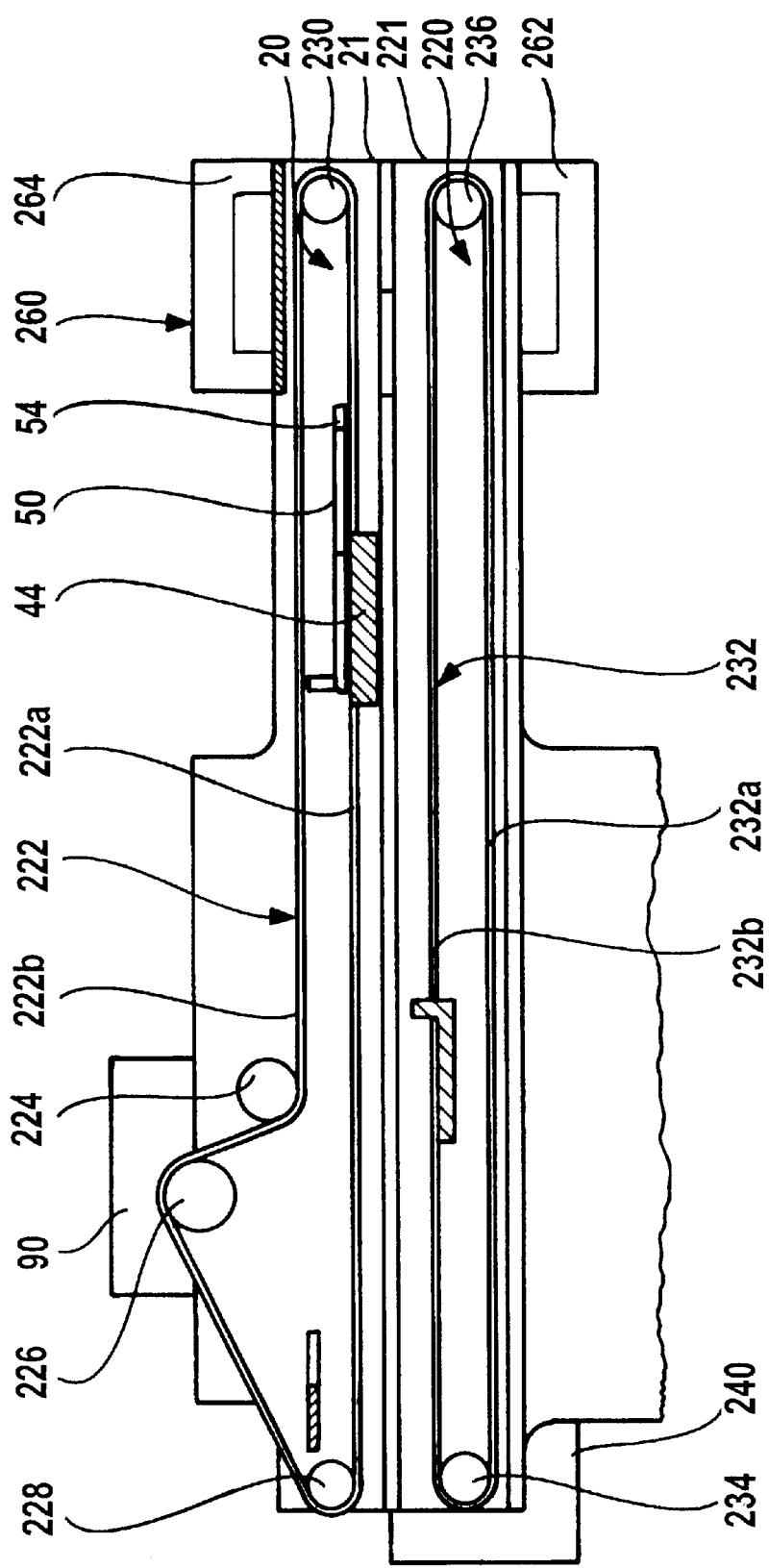
FIG. 6 shows a section along line 6—6 in FIG. 5.
Figure 9:
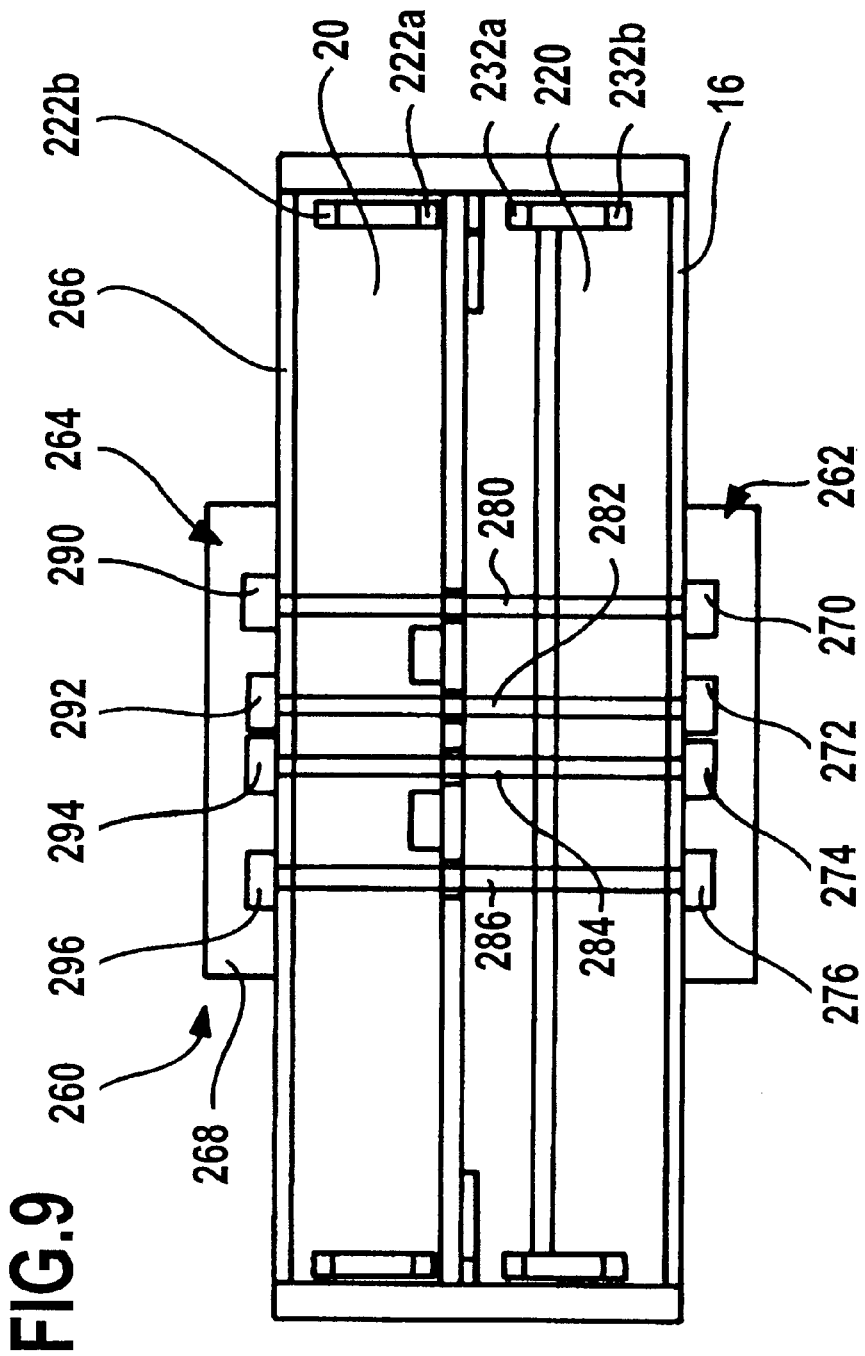
FIG. 9 shows a section along line 9—9 in FIG. 5.

In a second embodiment of an inventive data carrier transport unit, illustrated in FIGS. 5 and 6, those elements which are identical to those of the first embodiment are given the same reference numerals and so reference is made in full to the comments on the first embodiment with respect to their description.

In contrast to the first embodiment, not only the first compartment 20 is provided in the housing 10', as illustrated in FIGS. 5 and 6, but directly beneath it a second compartment 220 which can likewise receive the data carrier cassette 22.

Furthermore, the draw-in gripper means 40 which is movable in the first compartment 20 in gripping direction 41 as well as in draw-in direction 42 is associated exclusively with the compartment 20.

For this purpose, the slide 44 is again guided in the longitudinal guide means 46 and 48 provided on the side parts 12 and 14 such that it can move in the plane 49 which is located in the compartment 20 and extends parallel to this.

In order to move the draw-in gripper means 40, the slide is connected at its end to a lower half 222a of a toothed belt 222 whereas an upper half 222b of the toothed belt 222 extends over a deflection roller 224 to a drive wheel 226 connected to the servodrive 90 and is deflected into the lower half 222a via deflection rollers 128 and 130 arranged at the ends of the upper half 222b. The slide 44 is preferably connected directly to the lower half of the belt and thus movable due to movement of the endless toothed belt 222 in gripping direction 41 as well as in the draw-in direction contrary thereto.

Furthermore, the ejector 100 in the second embodiment, as is clearly apparent, in particular, from FIG. 6, is associated exclusively with the second compartment 220 and movable in the plane 103 which extends through the second compartment 220. The movement of the ejector 100 therefore has an effect merely on a data carrier cassette 22 arranged in the second compartment 220.

The ejector 100 is, for its part, likewise movable by means of a toothed belt 232 and connected to an upper half 232b thereof which merges into a lower half 232a via deflection rollers 234 and 236 at the ends. For example, the toothed belt 232 is driven via one of the end drive rollers 134 by means of a servomotor 240, with which the ejector 100 is movable in the second compartment 220 not only in the ejection direction 106 but also in the return direction 105.

The advantage of the second embodiment of the inventive solution is to be seen in the fact that, as illustrated in FIG. 7, the data carrier cassette is drawn into the first compartment 20 first of all by means of the draw-in gripper means 40, wherein during drawing in the data carrier cassette 22 is, on the one hand, held by the gripping arms 50 of the draw-in gripper means 40 and, on the other hand, rests on a base part 242 of the first compartment 20, which adjoins the compartment opening 21; since the base part 242 does, however, extend only over a slight partial distance of the first compartment and ends with a rear edge 244, which extends at an angle to the draw-in direction 42 and is adjoined by a transfer opening, the data carrier cassette is not supported by the base part 242 when reaching the transfer position illustrated by dashed lines in FIG. 7 and so the data carrier cassette 22, as illustrated in FIG. 5, falls into the second compartment with a rear end region 246, which is first of all supported by the base part 242, but is still held for the time being with its front end region 248 by the draw-in gripper means 40 moving in the first compartment 20. If, however, the draw-in gripper means 40 is moved in the first compartment 20 even further beyond the transfer position in the draw-in direction 42 as far as its opening position, a path follower 250 arranged on the respective gripping arm 50 interacts with a cam path 252 which is arranged in the region of the opening position, namely in such a manner that the gripping arms 50 transfer into their opened position and thus the front end region 248 can also move freely and falls through the transfer opening 245 into the second compartment 120 on account of the effect of gravity, as illustrated by dashed lines in FIG. 8.

The data carrier cassette 22 is thus located in the second compartment 220 and can be ejected by the ejector 100 due to a movement thereof in the ejection direction 106, again through a compartment opening 221 of the second compartment 220 located at the level of the compartment opening 21 of the first compartment 20, wherein in this case the ejector 100 is, during the drawing in of the data carrier cassette 22 by means of the draw-in gripper means 40, in a position which is approximately beneath the opening position of the draw-in gripper means 40 and so the data carrier cassette 22 can fall from the first compartment 20 into the second compartment 220 through the transfer opening 245 without contact with the ejector 100.

It is thus possible in the second embodiment of the inventive data carrier transport unit, illustrated in FIGS. 5 to 8, to draw in a data carrier cassette 22 in the first compartment 20 and bring it into a transfer position so that this then falls into the second compartment 220 on account of the effect of gravity and can then be ejected at the location provided for delivery. At the same time, the draw-in gripper means 40 is, however, free again and so this is in a position, although a data carrier cassette 22 is located in the second compartment 220 ready for ejection, to grip a further data carrier cassette and draw it in but only to such an extent that this still rests on the base part 242 and does not reach the transfer position so that the data carrier cassette in the second compartment 220 can be ejected without any hindrance from the additional data carrier cassette in the first compartment 20 and after it has been ejected the data carrier cassette present in the first compartment 20 can again be transferred into the second compartment 220.

In the second embodiment of the inventive data carrier transport unit, as illustrated in FIGS. 5 to 9, a position detection unit 260 is provided which has a light barrier arrangement with a transmitter unit 262 and a receiver unit 264.

The transmitter unit 262 comprises four transmitter devices 270, 272, 274 and 276 which generate four light beams 280, 282, 284 and 286 which start, for example, from the base part 16, penetrate the compartment 220 and the compartment 20 and are received by four receiver devices 290, 292, 294 and 296.

The base part 16 is provided with recesses for the light beams 280 to 286 and, in addition, a support 266 for the receiver unit 264 is also provided with corresponding passages for the light beams 280 to 286.

As illustrated in detail in FIG. 5 and FIG. 10, the gripping arms 50' and 52' of the draw-in gripper means 40 are designed, in addition, such that they have front arm sections 300 and 302 which bear the gripping jaws 54 and 56 in the region of their front ends 304 and 306 and in the region of their sides 308 and 310 located opposite the front ends merge into angled regions 312 and 314 which extend in the direction towards one another to mounting areas 316 and 318 of the gripping arms 50' and 52' which, for their part, are mounted on the slide 44 so as to be pivotable about the pivot axes 58 and 60. Optically detectable measurement arms 320 and 322 extend from these mounting areas 316 and 318, namely away from the pivot axes 58 and 60 in a direction opposite to the front regions 300 and 302.

The measurement arms 320 and 322 each have side edges 342a and 324b as well as 326a and 326b which are optically detectable. For this purpose, as illustrated in FIGS. 5 and 10, openings 328a and 328b as well as 330a and 330b associated with each of the measurement arms 320 and 322 are provided in the slide 44, these openings allowing the light beams 280 to 286 to pass through the slide 44 in order to detect the edges 324 and 326 of the measurement arms 320 and 322 in their position relative to the light beams 280 to 286.

Figure 10A:
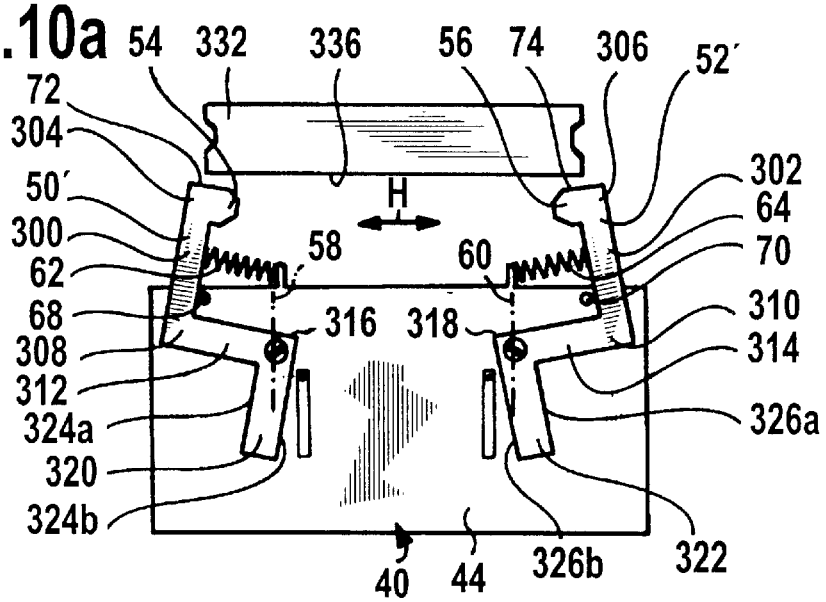
FIGS. 10a–10c show a schematic, simplified illustration of positions taken up by the position detection unit according to the second embodiment while scanning a reference object.
Figure 10B:
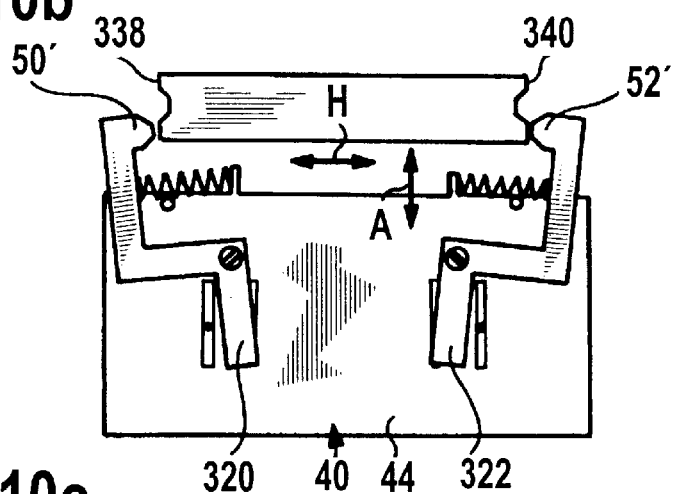
Figure 10C:
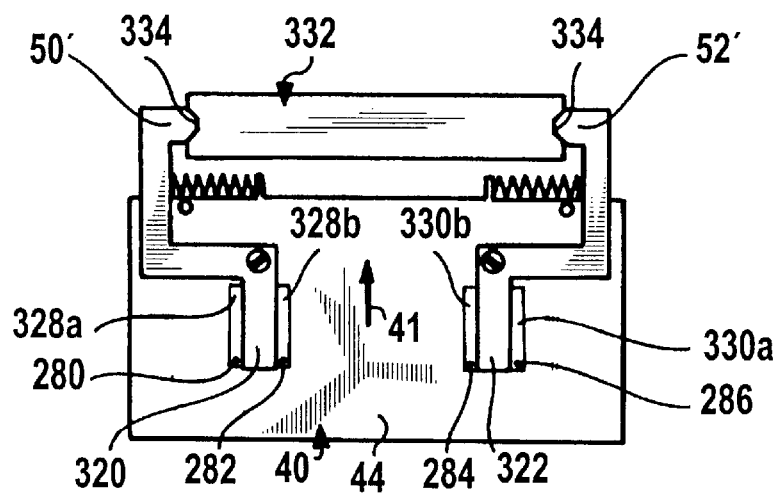

The openings 328a, b as well as 330a, b are thereby located such that in the gripping position of the gripping arms 50' and 52' illustrated in FIG. 10c, in which they engage in the recesses 334 of an object of measurement 332 corresponding in its shape to a data carrier cassette 322, the openings 328a, b, 330a, b are located on both sides of the edges 324a, b and 326a, b of the measurement arms 320 and 322 and extend laterally of the edges 324a and 324b as well as 326a and 326b with a slight tolerance.

In the gripping position illustrated in FIG. 10c, the edges 324a, b as well as 326a, b preferably extend parallel to the gripping direction 41 and the openings 328a, b as well as 330a, b likewise extend parallel to the gripping direction 41 as slits.

Furthermore, the course of the light beams 280 to 286 through the housing 10 is selected such that in the gripping position illustrated in FIG. 10c the light beam 280 passes through the opening 328a, the light beam 282 through the opening 338b, the light beam 284 through the opening 330b and the light beam 286 through the opening 330a, namely in the region of an end of the openings 328a, b as well as 330a, b to the rear when seen in the gripping direction 41 and thus detects a region of the measurement arms 320 and 322 which is likewise to the rear when seen in gripping direction 41 by detecting the edges 324a, 324b as well as 326a and 326b, wherein in the correct and centered gripping position, as illustrated in FIG. 10, all the light beams 280 to 286 extend laterally of the edges 324a, b as well as 326a, b of the measurement arms 320 and 322 and uninfluenced by these so that an evaluation stage 268 of the position detection unit can conclude from this that when the draw-in gripper means 40 is in the gripping position the gripping arms 50' and 52' are also in the correct gripping position.

Prior to gripping the reference object 332 and also prior to gripping a data carrier cassette 22, the gripping arms 50' and 52' are, however, on account of the action of the springs 62 and 64 in a starting position which is defined by the stops 68 and 70 limiting the movement of the gripping arms 50', 52' towards one another.

In this starting position, the gripping arms 50' and 52' are pivoted with the gripping jaws 54 and 56 in the direction towards one another and held in this position by the springs 62 and 64. In the starting position, the respective measurement arm 320 and 322 completely covers the opening 328a and 330a, respectively.

The openings 328a, b and 330a, b as well as the length of the measurement arms 320 and 322 corresponding thereto are dimensioned such that during movement of the draw-in gripper means 40 in the gripping direction 41 the light beams 280 to 286 each pass through close to front ends of the openings 328a, b and 330a, b immediately prior to any contact of the gripping arms 50', 52' with the reference object 332 or a correctly inserted data carrier cassette 22. If the draw-in gripper means 40 is now advanced, proceeding from this position, to such an extent that the gripping arms 50' and 52' are situated immediately prior to any contact with the reference object 332, the light beams 282 and 284 may still pass through the openings 328b and 330b, respectively, unhindered but on account of the measurement arms 320 and 322 covering the openings 328a and 330a, respectively, the light beams 280 and 286 are interrupted and the evaluation stage 286 thus knows that the gripping arms 50' and 52' are in their starting position.

If the draw-in gripper means 40 is now moved further in the gripping direction 41, proceeding from the position illustrated in FIG. 10a, the gripping arms 50' and 52' come to rest with their abutting surfaces 72 and 74 located to the front in gripping direction 41 on an end side 336 of the reference object 332 shaped like a data carrier cassette 22 and the gripping arms 50' and 52' start to pivot out of the starting position so that the gripping jaws 50, 56 move away from one another and thus the measurement arms 320 and 322 are pivoted successively in the direction of their gripping position and take up an intermediate position corresponding thereto, in which the edges 324a, b and 326a, b extend parallel to the gripping direction and thus the light beams 280 to 286 can pass through the openings 328a, b and 330a, b unhindered. The evaluation stage 268 does not, however, recognize this position as gripping position since this position has been taken up proceeding from the starting position and a release position was not passed through.

If the draw-in gripper means 40 is moved further in gripping direction 41, the gripping jaws 54 and 56 move even further away from one another, namely into a release position, in which the gripping arms 320 and 322 successively cover the openings 328b and 330b, respectively, and thereby lead to an interruption in the light beams 282 and 284 while the light beams 280 and 286 can still pass unhindered through the openings 328a and 330a, respectively. As a result of the interruption of the light beams 282 and 284 the evaluation circuit 268 recognizes the release position.

If the gripper means is now moved further in the gripping direction 41, the gripping arms 50' and 52' transfer into their gripping position, in which, on the one hand,—as already explained—the light beams 280 to 286 pass unhindered through the openings 328a, b and 330a, b and, in addition, the light beams 280 to 286 are located in the region of the openings 328a, b and 330a, b to the rear when seen in gripping direction 41.

The monitoring of the individual positions of the gripping arms 50' and 52' as described is primarily a monitoring of the gripping of the reference object 332 but does, at the same time, represent a monitoring of the positioning of the draw-in gripper means relative to the reference object 332 which results in the following.

If, for example, the draw-in gripper means 40 moves with gripping arms 50' and 52' in starting position, as illustrated in FIG. 10, from a position offset, for example, to the left in a horizontal direction towards the reference object 332, the abutting surface 52 of the gripping arm 50' cannot touch the reference object 332 at all but there is merely contact between the abutting surface 74 and the end side 336 of the reference object 332 and so during further movement of the draw-in gripper means 40 in gripping direction 41 only the measurement arm 332 releases the opening 330a and thus allows the light beam 286 to pass through unhindered whereas the measurement arm 320 still covers the opening 328a and the light beam 280 is still interrupted. The evaluation stage 268 thus recognizes a rough offset of the draw-in gripper means 40 relative to the measurement object 332 in a horizontal direction H.

In addition, a fine detection of the positioning in horizontal direction H is possible when the gripping arms 50', 52', as illustrated in FIG. 10, are in their release position and abut on the narrow sides 338 and 340 of the reference object 332 corresponding to the narrow sides 30 and 32 outside the recesses 334.

A slight offset in the horizontal direction H results in the measurement arms 320 and 322 covering the openings 328b and 330b, respectively, to an unequal extent, wherein the light beams 280 to 286 pass through a region of the openings 328a, b and 330a, b approximately in the center when seen in gripping direction 41 and so an uneven covering of the openings 328b and 330b results in the two light beams 382 and 384 not being interrupted at the same time but rather one not being interrupted at least to some extent or not interrupted at all. The evaluation circuit 268 can also recognize from this an asymmetric positioning of the draw-in gripper means 40 relative to the reference object 332 and ascertain a position correction of the position in horizontal direction H.

In addition, the position of the draw-in gripper means in the distance direction A is recognized in accordance with it reaching the gripping position illustrated in FIG. 10c.

If, for example, the draw-in gripper means 40 is moved forward in gripping direction 41 to a maximum and has thus reached its front end position which does not, however, coincide with the gripping position of the gripping arms 50' and 52' on account of a positioning error in distance direction A, the gripping arms 50' and 52' do not reach the gripping position at all but remain, for example in this maximum position of the draw-in gripper means 40 displaced in gripping direction, in a release position illustrated in FIG. 10b, from which the evaluation circuit 268 can recognize the positioning error and, subsequently, the handling unit can displace the entire data carrier transport unit in distance direction to such an extent until the gripping arms 50' and 52' are in the correct gripping position in accordance with 10c and this is also recognizable by the evaluation circuit 286 from the light beams 280 to 286 on account of their non-interruption.

In addition, a correct positioning of the draw-in gripper means 40 in vertical direction can likewise be recognized in that upon a first contact between the abutting surfaces 72 and 74 and the end side 336 of the reference object 332 and the pivoting of the gripping arms 50' and 52' caused thereby, for example, into an intermediate position corresponding to the gripping position, preferably without previously passing through the release position, the entire data carrier transport unit is moved in a vertical direction and for such a time until the gripping arms 50' and 52' no longer abut against the end side 336 but grip beyond the reference object 332 shaped in accordance with the data carrier cassette 22 and thus suddenly transfer again, since the end side 336 no longer acts against the abutting surfaces 72, 74, into their starting position, in which the measurement arms 320 and 322 cover the openings 328a and 330a, respectively. This sudden change can be recognized by the evaluation stage 268 and due to this change it is apparent for the evaluation circuit 268 that the vertical position of the gripping arms 50' and 52' now corresponds to an upper edge of the end side 336 of the reference object 332.

To summarize, the position detection unit 260 of the second embodiment of the inventive data carrier archiving system is thus in a position to carry out a check of the correct positioning of the data carrier transport unit T by the handling unit HE, on account of the contact of the gripping arms 50', 52' with an object of measurement 332 and the scanning of the individual positions of the gripping arms 50' and 52', without additional measures being required.

The reference object 332 used in accordance with the invention is preferably arranged at a defined location, preferably securely connected to the data carrier store 110 or to a drive 112, so that this can be approached separately for the purpose of checking the positioning of the data carrier transport unit T.

It is, however, also conceivable to arrange several such reference objects 332 distributed at various locations of the data carrier archiving system in order to have the chance to detect local inexact measurements in the system construction as a result of the several such reference objects 332 and compensate for these.

Alternatively thereto, it is, however, also conceivable to select one of the data carrier cassettes 22 as reference object and to carry out a check of the positioning of the data carrier transport unit T by the handling unit on account of its position in the respective compartment, wherein this positioning is always affected by the clearance of this data carrier cassette in the respective compartment as an uncertain factor.

What is claimed is:

1. Data carrier archiving system with a data carrier store comprising a plurality of storage compartments and at least one drive for data carriers and with a data carrier transport unit movable in a space in three different spatial directions by means of a handling unit for transporting the data carriers between different compartments of the data carrier store and/or the at least one drive, wherein the data carrier transport unit is provided with a position detection unit for carrying out scanning of a reference object after random operational phases for determination of a position of the data carrier transport unit in at least one of three different spatial directions relative to the reference object, and the position detecting unit including at least one movable measurement arm of the data carrier transport unit, its positions being influenced by mechanical contact with the reference object effectable in accordance with the positioning of the data carrier transport unit in the space.

2. Data carrier archiving system as defined in claim 1, wherein the position detection unit optically detects the position of the movable measurement arm.

3. Data carrier archiving system as defined in claim 1, characterized in that the position detection unit is arranged on a housing of the data carrier transport unit.

4. Data carrier archiving system as defined in claim 1, characterized in that the reference object has the shape similar to that of an area of one of the data carriers, said area interacting with the at least one gripping arm during the gripping of this data carrier.

5. Data carrier archiving system as defined in claim 1, characterized in that the at least one measurement arm is mounted on a support member thereof so as to be movable.

6. Data carrier archiving system as defined in claim 1, characterized in that with a predetermined movement of the at least one measurement arm the position detection unit detects measurement sections of the measurement arm moving to different extents.

7. Data carrier archiving system as defined in claim 1, characterized in that the measurement arm is at least one gripping arm of a gripper means of the data carrier transport unit, its positions being influenced by contact with the reference object effectable in accordance with the positioning of the data carrier transport unit in the space.

8. Data carrier archiving system as defined in claim 7, characterized in that the gripping arm comprises a pivot having a pivot axis and, in that during detection of the deviation from a starting position, the position detection unit detects the measurement section of the gripping arm having the smallest radial distance from the pivot axis.

9. Data carrier archiving system as defined in claim 7, characterized in that the at least one gripping arm is movable during interaction with the reference object from its starting position via an intermediate position corresponding to a gripping position into a release position and from this into the gripping position.

10. Data carrier archiving system as defined in claim 7, characterized in that the position detection unit detects a position in a second spatial direction extending in gripping direction as a result of movement of the at least one gripping arm into a gripping position.

11. Data carrier archiving system as defined in claim 7, characterized in that the position detection unit detects a position in a third spatial direction extending transversely to the first and second spatial directions as a result of movement of the gripper means in this spatial direction and additional movement in the second spatial direction and detection of the deviation of the gripping arm from a starting position.

12. Data carrier archiving system with a data carrier store comprising a plurality of storage compartments and at least one drive for data carriers and with a data carrier transport unit movable in a space in three different spatial directions by means of a handling unit for transporting the data carriers between different compartments of the data carrier store and/or the at least one drive, wherein the data carrier transport unit is provided with a position detection unit for carrying out scanning of a reference object after random operational phases for determination of a position of the data carrier transport unit in at least one of three different spatial directions relative to the reference object, and the position detecting unit including at least one movable measurement arm of the data carrier transport unit, its positions being influenced by contact with the reference object effectable in accordance with the positioning of the data carrier transport unit in the space, wherein the at least one measurement arm is held standing in a starting position by an elastic biasing means and is movable out of its starting position contrary to the action of the elastic biasing means.

13. Data carrier archiving system as defined in claim 12, characterized in that the position detection unit detects deviations of the at least one measurement arm from the starting position.

14. Data carrier archiving system with a data carrier store comprising a plurality of storage compartments and at least one drive for data carriers and with a data carrier transport unit movable in a space in three different spatial directions by means of a handling unit for transporting the data carriers between different compartments of the data carrier store and/or the at least one drive, wherein the data carrier transport unit is provided with a position detection unit for carrying out scanning of a reference object after random operational phases for determination of a position of the data carrier transport unit in at least one of three different spatial directions relative to the reference object, and the position detecting unit including at least one movable measurement arm of the data carrier transport unit, its positions being influenced by contact with the reference object effectable in accordance with the positioning of the data carrier transport unit in the space, wherein the measurement arm is mounted so as to be pivotable about a pivot axis and that the position detection unit detects different pivot positions of the measurement arm.

15. Data carrier archiving system with a data carrier store comprising a plurality of storage compartments and at least one drive for data carriers and with a data carrier transport unit movable in a space in three different spatial directions by means of a handling unit for transporting the data carriers between different compartments of the data carrier store and/or the at least one drive, wherein the data carrier transport unit is provided with a position detection unit for carrying out scanning of a reference object after random operational phases for determination of a position of the data carrier transport unit in at least one of three different spatial directions relative to the reference object, and the position detecting unit including at least one movable measurement arm of the data carrier transport unit, its positions being influenced by contact with the reference object effectable in accordance with the positioning of the data carrier transport unit in the space, wherein the measurement arm is movable in a gripping direction relative to a housing of the data carrier transport unit in order to interact with the reference object and that the position detection unit detects different measurement sections of the at least one measurement arm at different positions of the measurement arm in the gripping direction.

16. Data carrier archiving system with a data carrier store comprising a plurality of storage compartments and at least one drive for data carriers and with a data carrier transport unit movable in a space in three different spatial directions by means of a handling unit for transporting the data carriers between different compartments of the data carrier store and/or the at least one drive, wherein the data carrier transport unit is provided with a position detection unit for carrying out scanning of a reference object after random operational phases for determination of a position of the data carrier transport unit in at least one of three different spatial directions relative to the reference object, and the position detecting unit including at least one movable measurement arm of the data carrier transport unit, its positions being influenced by contact with the reference object effectable in accordance with the positioning of the data carrier transport unit in the space, wherein the measurement arm is at least one gripping arm of a gripper means of the data carrier transport unit, its positions being influenced by contact with the reference object effectable in accordance with the positioning of the data carrier transport unit in the space and wherein the positions of the at least one gripping arm taken up by said gripping arm during gripping of one of the data carriers are detectable with the position detection unit.

17. Data carrier archiving system as defined in claim 16, characterized in that the position detection unit detects a gripping position of the at least one gripping arm corresponding to a gripped data carrier and deviations from the gripping position.

18. Data carrier archiving system as defined in claim 17, characterized in that the position detection unit comprises deviations from the gripping position in the direction of a release position of the gripping arm.

19. Data carrier archiving system as defined in claim 17, characterized in that the position detection unit detects deviations of the gripping arm from the gripping position in the direction of the starting position.

20. Data carrier archiving system as defined in claim 16, characterized in that the gripping arm comprises a pivot having a pivot axis and, in a gripping position of the gripping arm, the position detection unit detects the measurement section of the gripping arm having the greater radial distance from the pivot axis.

21. Data carrier archiving system with a data carrier store comprising a plurality of storage compartments and at least one drive for data carriers and with a data carrier transport unit movable in a space in three different spatial directions by means of a handling unit for transporting the data carriers between different compartments of the data carrier store and/or the at least one drive, wherein the data carrier transport unit is provided with a position detection unit for carrying out scanning of a reference object after random operational phases for determination of a position of the data carrier transport unit in at least one of three different spatial directions relative to the reference object, and the position detecting unit including at least one movable measurement arm of the data carrier transport unit, its positions being influenced by contact with the reference object effectable in accordance with the positioning of the data carrier transport unit in the space, wherein the measurement arm is at least one gripping arm of a gripper means of the data carrier transport unit, its positions being influenced by contact with the reference object effectable in accordance with the positioning of the data carrier transport unit in the space and wherein the position detection unit detects two movable gripping arms of the gripper means interacting for gripping one of the data carriers as two separate objects of measurement.

22. Data carrier archiving system as defined in claim 21, characterized in that the position detection unit compares the positions of the gripping arms with one another in order to detect a first spatial direction extending transversely to the gripping direction and in a plane of movement of the gripping arms.

23. Data carrier archiving system with a data carrier store comprising a plurality of storage compartments and at least one drive for data carriers and with a data carrier transport unit movable in a space in three different spatial directions by means of a handling unit for transporting the data carriers between different compartments of the data carrier store and/or the at least one drive, wherein the data carrier transport unit is provided with a position detection unit for carrying out scanning of a reference object after random operational phases for determination of a position of the data carrier transport unit in at least one of three different spatial directions, wherein the position detection unit optically detects a position of an object of measurement influenced by the positioning of the data carrier transport unit in the space relative to the reference object, wherein the object of measurement corresponds to the reference object, and is a pattern detectable by the position detection unit, said pattern having first and second markings reflecting optically differently and being associated with a spatially defined location, wherein the position detection unit scans the markings of the pattern in a scanning direction with a reading beam, wherein said second marking extends in a second spatial direction extending transversely to a first spatial direction, wherein at least one of said first spatial direction and said second spatial direction extends in said scanning direction, the second marking having an extension detectable in the first spatial direction and varying in the second spatial direction, and a reference marking associated with the second marking, said reference marking defining an extension which is constant in the first spatial direction and independent of the second spatial direction.

24. Data carrier archiving system as defined in claim 23, characterized in that the pattern has a first marking extending in a first spatial direction parallel to the reading direction.

25. Data carrier archiving system as defined in claim 24, characterized in that the first marking has a defined extension in the first spatial direction detectable by the position detection unit.

26. Data carrier archiving system as defined in claim 23, characterized in that the position detection unit ascertains a position in the second spatial direction on the basis of a ratio of the extension of the second marking in the first spatial direction to the extension of the reference marking in the first spatial direction.

27. Data carrier archiving system with a data carrier store comprising a plurality of storage compartments and at least one drive for data carriers and with a data carrier transport unit movable in a space in three different spatial directions by means of a handling unit for transporting the data carriers between different compartments of the data carrier store and/or the at least one drive, wherein the data carrier transport unit is provided with a position detection unit for carrying out scanning of a reference object after random operational phases for determination of a position of the data carrier transport unit in at least one of three different spatial directions, the position detection unit optically detecting a position of an object of measurement influenced by the positioning of the data carrier transport unit in the space relative to the reference object, wherein the object of measurement corresponds to the reference object and is a pattern detectable by the position detection unit, said pattern having markings reflecting optically differently and being associated with a spatially defined location, wherein the position detection unit has a marking arranged thereon, which defines a reference position of the position detection unit in relation to a starting point of a moving reading beam.

28. Data carrier archiving system as defined in claim 27, characterized in that the position detection unit scans the marking of the pattern with the reading beam.

29. Data carrier archiving system as defined in claim 28, characterized in that the reading beam is movable in a plane.

30. Data carrier archiving system as defined in claim 28, characterized in that the pattern comprises a second marking extending in a second spatial direction extending transversely to the first spatial direction.

31. Data carrier archiving system as defined in claim 30, characterized in that the second marking has an extension detectable in the first spatial direction and varying in the second spatial direction.

32. Data carrier archiving system as defined in claim 27, characterized in that the marking is designed as a screen determining a defined extension in the first spatial direction.

33. Data carrier archiving system as defined in claim 32, characterized in that the position detection unit ascertains a distance between the position detection unit and the first marking form a ratio of the extension of the screen in the first spatial direction to the extension of the first marking in the first spatial direction.

34. Data carrier archiving system as defined in claim 32, characterized in that the position detection unit ascertains a position in the first spatial direction from a relative position of the extension in the first spatial direction defined by the screen in relation to the extension defined by the first marking.

35. Data carrier archiving system as defined in claim 27, characterized in that the pattern comprises a bar code.

36. Data carrier archiving system as defined in claim 35, characterized in that the bar code comprises additional information detectable with the position information in a reading procedure.

37. Data carrier archiving system as defined in claim 35, characterized in that the bar code forms elements of the pattern for the position detection.

* * * * *